US012191605B2

(12) United States Patent
Cai et al.

(10) Patent No.: US 12,191,605 B2
(45) Date of Patent: Jan. 7, 2025

(54) SHIELDING PLATE, TERMINAL MODULE, HIGH-SPEED BACKPLANE CONNECTOR, AND CONNECTOR SYSTEM

(71) Applicant: Sichuan Yonggui Science and Technology Co., Ltd., Mianyang (CN)

(72) Inventors: Shemin Cai, Mianyang (CN); Shiqing Liu, Mianyang (CN)

(73) Assignee: SICHUAN YONGGUI SCIENCE AND TECHNOLOGY CO., LTD., Mianyang (CN)

( * ) Notice: Subject to any disclaimer, the term of this patent is extended or adjusted under 35 U.S.C. 154(b) by 358 days.

(21) Appl. No.: 17/729,013

(22) Filed: Apr. 26, 2022

(65) Prior Publication Data

US 2022/0393405 A1 Dec. 8, 2022

(30) Foreign Application Priority Data

Jun. 3, 2021 (CN) ......................... 202110620459.1
Jun. 3, 2021 (CN) ......................... 202110620472.7
(Continued)

(51) Int. Cl.
*H01R 13/02* (2006.01)
*H01R 13/6471* (2011.01)
(Continued)

(52) U.S. Cl.
CPC ..... *H01R 13/6587* (2013.01); *H01R 13/6471* (2013.01); *H01R 13/6597* (2013.01); *H01R 13/6594* (2013.01)

(58) Field of Classification Search
CPC ............ H01R 13/6461; H01R 13/6471; H01R 13/6587; H01R 13/6594; H01R 13/6597
See application file for complete search history.

(56) References Cited

U.S. PATENT DOCUMENTS 7,651,337 B2 * 1/2010 McNamara .......... H01R 13/514 439/65
2014/0248796 A1 * 9/2014 Pan .................... H01R 13/6587 439/540.1
(Continued)

FOREIGN PATENT DOCUMENTS

CN 104022402 A 9/2014
CN 105742854 A 7/2016
(Continued)

OTHER PUBLICATIONS

The First Office Action and Search Report Dated May 30, 2022, for Sichuan Yonggul Science and Technology Co.,Ltd from China Application No. 202110620472.7 and its English translsation.
(Continued)

*Primary Examiner* — Abdullah A Riyami
*Assistant Examiner* — Thang H Nguyen
(74) *Attorney, Agent, or Firm* — Rivka Friedman

(57) ABSTRACT

The present application discloses a shielding plate, a terminal module, a high-speed backplane connector, and a connector system. The shielding plate is provided with an ingenious grounding structure, such as alternately arranged concave strips and convex strips, and has a good grounding function. The high-speed backplane connector provided in the present application includes a plurality of terminal modules and an insulative shell for receiving the terminal modules. Each terminal module includes a plurality of pairs of differential signal terminals arranged in a terminal row, a plurality of conductive spacers arranged in the terminal row at intervals, and a shielding plate; the shielding plate is fixed on one side of a fixing frame and connected with the conductive spacers; the pair of differential signal terminals can be shielded by arranging the concave strips and the
(Continued)

convex strips, effectively reducing interference and crosstalk between the adjacent pairs of differential signal terminals.

18 Claims, 8 Drawing Sheets

(30) Foreign Application Priority Data

| | | | |
|---|---|---|---|
| Jun. 3, 2021 | (CN) | ......................... | 202121237779.0 |
| Aug. 13, 2021 | (CN) | ......................... | 202110930922.2 |

(51) Int. Cl.

| | |
|---|---|
| ***H01R 13/648*** | (2006.01) |
| ***H01R 13/6587*** | (2011.01) |
| ***H01R 13/6597*** | (2011.01) |
| *H01R 13/6594* | (2011.01) |

(56) References Cited

U.S. PATENT DOCUMENTS

| | | | | |
|---|---|---|---|---|
| 2021/0281016 | A1 * | 9/2021 | Laurx .................. | H01R 13/518 |
| 2021/0399448 | A1 * | 12/2021 | Song .................... | H01R 13/514 |
| 2021/0399494 | A1 * | 12/2021 | Liu .................... | H01R 13/6588 |

FOREIGN PATENT DOCUMENTS

| | | | | | |
|---|---|---|---|---|---|
| CN | 108352633 | A | | 7/2018 | |
| CN | 209401906 | U | | 9/2019 | |
| CN | 110391550 | A | | 10/2019 | |
| CN | 210866667 | U | | 6/2020 | |
| CN | 211351163 | U | | 8/2020 | |
| CN | 111682366 | A | | 9/2020 | |
| CN | 101884140 | A | | 11/2020 | |
| CN | 111987516 | | * | 11/2020 | ............. H01R 13/40 |
| CN | 111987516 | A | | 11/2020 | |
| CN | 111987516 | U | | 11/2020 | |
| EP | 3407430 | A1 | | 11/2018 | |
| WO | WO-2021037068 | A1 | * | 3/2021 | |

OTHER PUBLICATIONS

The First Office Action and Search Report Dated May 2, 3002, for Sichuan Yonggui Science and Technology Co.,Ltd from China Application No. 202110620459.1 and its English translsation.

Extended European Search Report Dated Oct. 18, 2022 From European Patent Office Re. Application No. EP22169689.1.

* cited by examiner

SHIELDING PLATE, TERMINAL MODULE, HIGH-SPEED BACKPLANE CONNECTOR, AND CONNECTOR SYSTEM

CROSS-REFERENCE TO RELATED APPLICATIONS

This disclosure claims priority to four Chinese patent applications as follows: a first application with an application date of Jun. 3, 2021, an application number of "202121237779.0", and an application title of "CONDUCTIVE SHEET"; a second application with an application date of Jun. 3, 2021, an application number of "202110620472.7", and an application title of "TERMINAL MODULE"; a third application with an application date of Jun. 3, 2021, an application number of "202110620459.1", and an application title of "HIGH-SPEED BACKPLANE CONNECTOR AND CONNECTOR SYSTEM"; a fourth application with an application date of Aug. 13, 2021, an application number of "202110930922.2", and an application title of "SHIELDING PLATE, TERMINAL MODULE, RECEPTACLE CONNECTOR AND CONNECTOR ASSEMBLY"; entire contents of which are by reference incorporated in its entirety in this disclosure.

BACKGROUND OF THE DISCLOSURE

Field of the Disclosure

The present application relates to a technical field of electrical connectors, and in particular, to a shielding plate, a terminal module, a high-speed backplane connector, and a connector system.

Description of the Prior Art

Backplane connectors are a type of connectors commonly used in large-scale communication equipment, ultra-high-performance servers and supercomputers, industrial computers, and high-end storage devices. The backplane connectors are mainly used to connect daughter cards and backplanes. The daughter cards and the backplanes form a 90-degree vertical structure to transmit high-speed differential signals or single end signals and to transmit large current.

Due to development of communication technology, signal transmission speed is getting higher and higher, so it is necessary to solve a problem of interference and crosstalk between adjacent pairs of differential signal terminals caused by high-speed transmission of high-frequency signals.

Therefore, it is necessary to provide a shielding plate, a terminal module, a high-speed backplane connector, and a connector system, with a good grounding effect.

BRIEF SUMMARY OF THE DISCLOSURE

A shielding plate provided by an embodiment of the present application is provided with an ingenious grounding structure and has a good grounding function, and is used to solve a problem of interference and crosstalk caused by distributed capacitance and inductance caused by high-speed transmission of high-frequency signals.

A terminal module provided by an embodiment of the present application is provided with a shielding plate, which can solve a problem of interference and crosstalk caused by the distributed capacitance and inductance caused by the high-speed transmission of the high-frequency signals.

A high-speed backplane connector and a connector system provided by an embodiment of the present application are used to solve a problem of interference and crosstalk caused by the distributed capacitance and inductance caused by the high-speed transmission of the high-frequency signals.

According to an embodiment of the present application, the present application provides a shielding plate is disclosed. In a first aspect, the shielding plate comprises a shielding inner wall and a shielding outer wall arranged oppositely, wherein the shielding plate comprises alternately arranged a plurality of concave strips and a plurality of convex strips; the concave strips are recessed from the shielding outer wall to the shielding inner wall; the convex strips are protruded from the shielding inner wall to the shielding outer wall; the shielding plate comprises a front edge and a bottom edge that are perpendicular to each other, each of the concave strips protrudes downwardly at the bottom edge with a grounding pin, and the grounding pins are arranged in a row.

According to an embodiment of the present application, at least one of the concave strips has a mating section extending toward the front edge, a mounting section perpendicular to the mating section and extending toward the bottom edge, a middle section connecting the mating section and the mounting section, the grounding pins are disposed on the mounting section, and the grounding pins extend vertically and downwardly and extend out of the bottom edge of the shielding plate.

According to an embodiment of the present application, the shielding plate comprises a fixing structure.

According to an embodiment of the present application, the fixing structure comprises a plurality of protrusions, the protrusions are bent and protrude to the shielding inner wall.

According to an embodiment of the present application, the fixing structure comprises a plurality of sockets.

According to an embodiment of the present application, the shielding plate further comprises a clamping structure, the clamping structure comprises a plurality of fixing holes, the fixing holes pass through the shielding inner wall and the shielding outer wall; and the fixing holes are located on the concave strips.

According to an embodiment of the present application, the shielding plate comprises a shielding main plate and a shielding front plate connected with the shielding main plate and close to a front end, the shielding front plate is provided with a connecting portion, and the connecting portion extends toward the shielding inner wall.

According to an embodiment of the present application, the connecting portion is a collar, and the collar is formed by being vertically bent from an upper edge or a bottom edge of the shielding front plate toward the shielding inner wall.

According to an embodiment of the present application, the shielding front plate is provided with a plurality of elastic fingers protruding to the shielding inner wall.

According to an embodiment of the present application, the fixing structure is located in an extending direction of the concave strips, and the fixing structure is one of a tenon and a mortise.

According to an embodiment of the present application, the fixing structure is the mortise, the mortise comprises an opening, the opening is disposed towards the front edge of the shielding plate, a tenon mated with the mortise is disposed away from the front edge of the shielding plate, and a shape of the mortise comprises any one or a combination of a circle, a trapezoid, a triangle, a rectangle, a square, and a plum blossom.

According to an embodiment of the present application, the fixing structure is the tenon, the tenon is disposed towards the front edge of the shielding plate, a mortise mated with the tenon comprises an opening, the opening is disposed away from the front edge of the shielding plate, and a shape of the tenon comprises any one or a combination of a circle, a trapezoid, a triangle, a rectangle, a square, and a plum blossom.

According to an embodiment of the present application, each of the concave strips is further provided with a grounding-contacting portion, and the grounding-contacting portion is located at a front end of each of the concave strips.

According to an embodiment of the present application, the grounding-contacting portion is a contacting plate, and the contacting plate is connected to the shielding plate through two connecting arms.

According to an embodiment of the present application, a terminal module is disclosed. In a second aspect, the terminal module comprises: a lamellar fixing frame comprising a mating side and a mounting side that are perpendicular to each other; a plurality of pairs of differential signal terminals arranged in a terminal row and supported by the fixing frame; each pair of the differential signal terminals has a mating portion extending forwardly and extending out of the mating side, a mounting portion perpendicular to the mating portion and extending downwardly and extending out of the mounting side, and a base portion connecting the mating portion and the mounting portion; a plurality of conductive spacers arranged in the terminal row at intervals; each of the conductive spacers has an inserting end extending forwardly and extending out of the mating side, and a connecting end integrally formed with the inserting end, and arranged in an opposite direction of the inserting end; and the shielding plate mentioned above, being fixed on one side of the fixing frame and connected with the conductive spacers; the concave strips are recessed toward the fixing frame and extend into the terminal row aligned with and connected with the conductive spacers, and the convex strips protrude in a direction away from the fixing frame, each of the convex strips surrounds a corresponding pair of the differential signal terminals.

According to an embodiment of the present application, a high-speed backplane connector is disclosed. In a third aspect, the high-speed backplane connector comprises a plurality of terminal modules mentioned above arranged in parallel, and an insulative shell for receiving and fixing the terminal modules; each of the terminal module comprises a lamellar fixing frame comprising a mating side and a mounting side that are perpendicular to each other; a plurality of pairs of differential signal terminals arranged in a terminal row and supported by the fixing frame; each pair of the differential signal terminals has a mating portion extending forwardly and extending out of the mating side, a mounting portion perpendicular to the mating portion and extending downwardly and extending out of the mounting side, and a base portion connecting the mating portion and the mounting portion; a plurality of conductive spacers arranged in the terminal row at intervals; each of the conductive spacers has an inserting end extending forwardly and extending out of the mating side, and a connecting end integrally formed with the inserting end, and arranged in an opposite direction of the inserting end; and the shielding plate fixed on one side of the fixing frame and connected with the conductive spacers; the concave strips are recessed toward the fixing frame and extend into the terminal row aligned with and connected with the conductive spacers, and the convex strips protrude in a direction away from the fixing frame, each of the convex strips surrounds a corresponding pair of the differential signal terminals.

According to an embodiment of the present application, the shielding plate comprises a fixing structure.

According to an embodiment of the present application, the fixing structure is the mortise, the mortise comprises an opening, the opening is disposed towards the front edge of the shielding plate, a tenon mated with the mortise is disposed away from the front edge of the shielding plate, and a shape of the mortise comprises any one or a combination of a circle, a trapezoid, a triangle, a rectangle, a square, and a plum blossom.

According to an embodiment of the present application, the fixing structure is the tenon, the tenon is disposed towards the front edge of the shielding plate, a mortise mated with the tenon comprises an opening, the opening is disposed away from the front edge of the shielding plate, and a shape of the tenon comprises any one or a combination of a circle, a trapezoid, a triangle, a rectangle, a square, and a plum blossom.

According to an embodiment of the present application, a connector system is disclosed. In a fourth aspect, the connector system comprises a first connector and a second connector that are cooperated with each other, the first connector comprises a U-shaped base, a plurality of pairs of first differential signal terminals fixed on the base, and a plurality of first shielding members fixed on the base and corresponding to the first differential signal terminals; the second connector is the high-speed backplane connector mentioned above; wherein, the mating portions are used for mating with the first differential signal terminals, the inserting ends of the conductive spacers are used for mating with the first shielding members, and the mounting portions and the grounding pins are used for connecting with a circuit board.

Advantageous Effects of the Present Application are as Follows:

Firstly, the shielding plate provided by the present application can form a grounding protection effect on the differential signal terminals to be protected by providing the concave strips and the convex strips, and at a same time provides a function of preventing electromagnetic interference.

Secondly, the terminal module provided by the present application is provided with the shielding plate on one side of the fixing frame, and at a same time the shielding plate is connected to the conductive spacers; the shielding plate includes alternately arranged concave strips and convex strips, the concave strips are recessed toward the fixing frame and extend into the terminal row to be aligned with and connected with the conductive spacers, and the convex strips protrude to a direction away from the fixing frame, each of the convex strips surrounds a corresponding pair of the differential signal terminals; by arranging the concave strips and the convex strips, an upper side, a lower side and an outer side of the pair of differential signal terminals can be shielded, and another shielding plate adjacent to the shielding plate can shield the pair of differential signal terminals close to a side of another shielding plate, thereby forming a complete shielding structure around the pair of differential signal terminals, and interference and crosstalk between the adjacent pairs of differential signal terminals are effectively reduced.

In addition, the terminal module provided by the present application includes at least one group of terminal module component, and each terminal module component includes a first terminal module and a second terminal module arranged adjacently, since the first terminal module and the second terminal module provided in the present application have a same structure as the above-mentioned terminal module, therefore, the terminal module provided by the present application can effectively reduce interference and crosstalk between the adjacent pairs of differential signal terminals.

In addition, the shielding plate and the conductive spacers provided in another embodiment of the present application are connected by tenon and mortise, which ensures a stable and reliable grounding connection at a connecting position between the shielding plate and the conductive spacers.

Thirdly, the high-speed backplane connector in the present application can effectively reduce interference and crosstalk between the adjacent pairs of differential signal terminals by providing the above-mentioned terminal module.

Fourthly, the connector system provided by the present application includes a first connector and a second connector that are cooperated with each other, wherein the second connector has a same structure as the above-mentioned high-speed backplane connector, so the connector system provided by the present application can achieve a same technical effect as the above-mentioned high-speed backplane connector.

Figure 1:
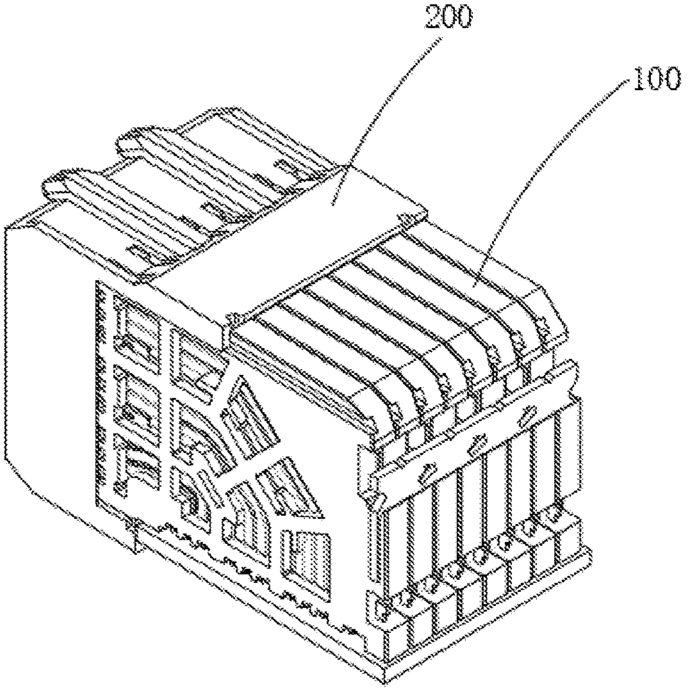
FIG. 1 is a three-dimensional structural schematic diagram of a high-speed backplane connector in an embodiment of the present application.

The Main Reference Labels in the Drawings of the Specification of the Present Application are Explained as Follows:

100—terminal module; 1*a*—first terminal module; 1*b*—second terminal module; 200—insulative shell; 1—fixing frame; 10—mating side; 11—mounting side; 13—fixing post; 2—differential signal terminal; 20—mating portion; 21—mounting portion; 22—base portion; 3/3'—conductive spacer; 30—inserting end; 31/31'—connecting end; 32—socket; 4/4'—shielding plate; 40/40*a*/40'—concave strip; 401—mating section; 402—mounting section; 403—middle section; 404—fixing hole; 41/41*a*—convex strip; 42—shielding inner wall; 43—shielding outer wall; 44—front edge; 45—bottom edge; 46—grounding pin; 47—protrusion; 48—shielding main plate; 49—shielding front plate; 491/491*a*/491*b*—collar; 492—elastic finger; 4*a*—first shielding plate; 4*b*—second shielding plate; 300—base; 301—first differential signal terminal; 302—first shielding member; 303—first circuit board; 304—circuit board; 480'—mortise; 481'—opening; 482'—grounding-contacting portion; 483'—connecting arm; 484'—limiting portion.

DETAILED DESCRIPTION OF THE PREFERRED EMBODIMENTS

A technical solution in an embodiment of the present application will be clearly and completely described below with reference to the drawings in an embodiment of the present application. Obviously, a described embodiment is only a part of embodiments of the present application, but not all embodiments. Based on the embodiments in the present application, all other embodiments obtained by those of ordinary skill in an art without creative efforts will fall within a protection scope of the present application.

In a description of the present application, it can be understood that, an orientation or positional relationship indicated by terms “center”, “upper”, “lower”, “front”, “rear”, “left”, “right”, “vertical”, “horizontal”, “top”, “bottom”, “inside”, “outside” and the like are based on an orientation or a positional relationship shown in accompanying drawings, which are only for convenience of describing the present application and simplifying the description, rather than indicating or implying that an indicated device or element must have a specific orientation, constructed and operation in a particular orientation, therefore it is not necessary to consider a limitation of the present application.

An embodiment of the present application provides a high-speed backplane connector, which includes a plurality of terminal modules 100 arranged in parallel, and an insulative shell 200 for receiving and fixing the terminal modules 100, each of the terminal modules 100 includes: a lamellar fixing frame 1 including a mating side 10 and a mounting side 11 that are perpendicular to each other; a plurality of pairs of differential signal terminals 2 arranged in a terminal row and supported by the fixing frame 1; each pair of the differential signal terminals 2 has a mating portion 20 extending forwardly and extending out of the mating side 10, a mounting portion 21 perpendicular to the mating portion 20, extending downwardly and extending out of the mounting side 11, and a base portion 22 connecting with the mating portion 20 and the mounting portion 21; a plurality of conductive spacers 3/3' arranged in the terminal row at intervals; each of the conductive spacers 3/3' has an inserting end 30 extending forwardly and extending out of the mating side 10 and a connecting end 31/31' integrally formed with the inserting end 30, and arranged in an opposite direction of the inserting end 30; a shielding plate 4/4' fixed on one side of the fixing frame 1 and connected with the conductive spacers 3/3'; the shielding plate 4/4' includes alternately arranged concave strips **40/40*a*/40' and convex strips 41/41*a*, the concave strips 40/40*a*/40' are recessed toward the fixing frame 1 and extend into the terminal row to be aligned with and connected with the conductive spacers 3/3'; and the convex strips 41/41*a* protrude in a direction away from the fixing frame 1, each of the convex strips 41/41*a* surrounds a corresponding pair of the differential signal terminals 2**.

A structure of the high-speed backplane connector will be described in detail below with reference to the accompanying drawings.

Figure 2:
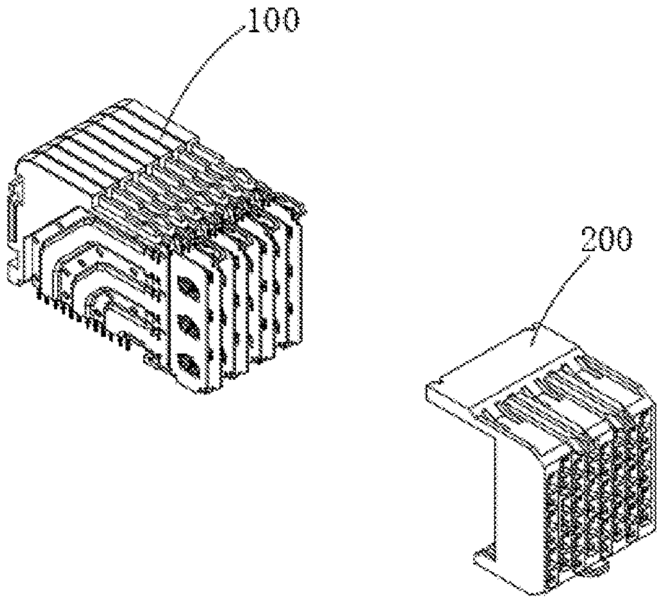
FIG. 2 is an exploded schematic diagram of a high-speed backplane connector in an embodiment of the present application.

FIG. 1 is a three-dimensional structural schematic diagram of a high-speed backplane connector in an embodiment of the present application; FIG. 2 is an exploded schematic diagram of a high-speed backplane connector in an embodiment of the present application. Referring to FIGS. 1 to 2, the high-speed backplane connector provided by the present application includes a plurality of terminal modules 100 arranged in parallel, and an insulative shell 200 for receiving and fixing the terminal modules 100. Wherein the high-speed backplane connector in FIGS. 1 and 2 includes eight terminal modules 100. In other embodiments, any number of terminal modules 100 may be provided to adapt to high-speed backplane connectors of different sizes.

Figure 3:
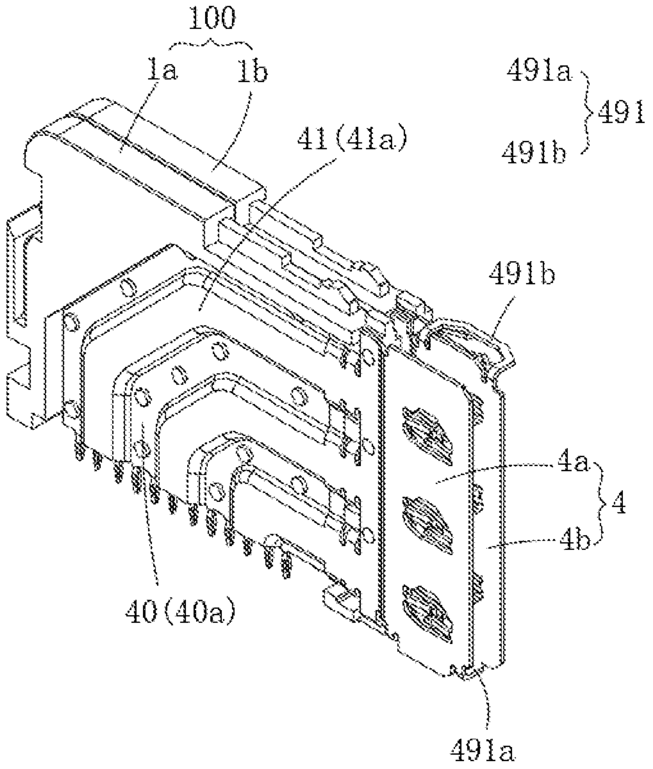
FIG. 3 is a structural schematic diagram of two adjacent terminal modules in a high-speed backplane connector in an embodiment of the present application.
Figure 4:
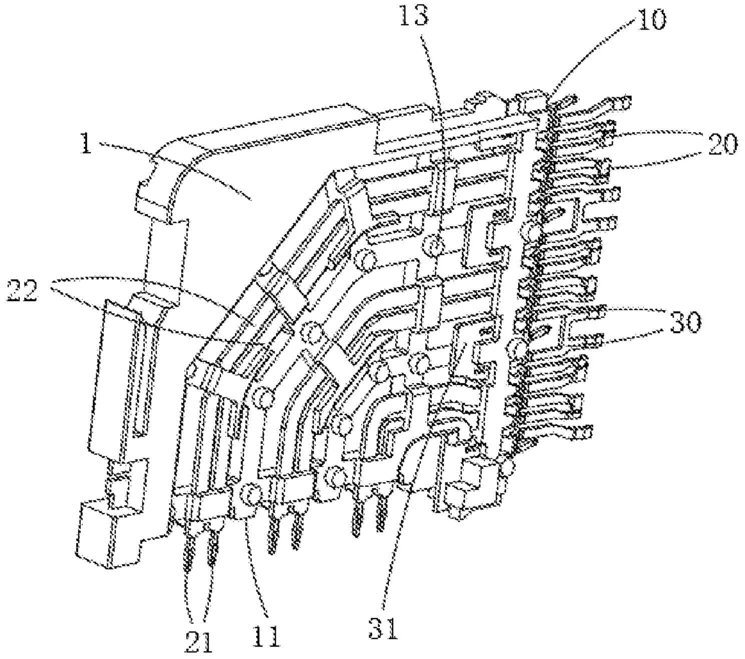
FIG. 4 is a structural schematic diagram of a fixing frame, differential signal terminals, and conductive spacers of a terminal module in an embodiment of the present application, so as to clearly show a connecting structure of the differential signal terminals, the conductive spacers, and the fixing frame.
Figure 7:
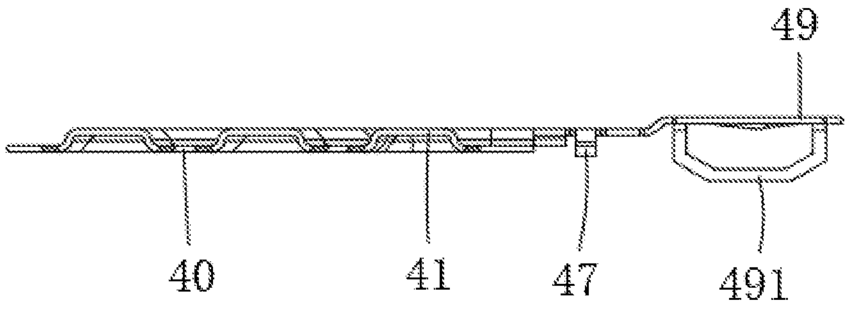
FIG. 7 is a bottom diagram of a shielding plate in an embodiment of the present application, to clearly show structures of concave strips and convex strips.

FIG. 3 is a structural schematic diagram of two adjacent terminal modules in a high-speed backplane connector in an embodiment of the present application; FIG. 4 is a structural schematic diagram of a fixing frame, differential signal terminals, and conductive spacers of a terminal module in an embodiment of the present application, so as to clearly show a connecting structure of the differential signal terminals, the conductive spacers, and the fixing frame; FIG. 7 is a bottom diagram of a shielding plate in an embodiment of the present application, to clearly show structures of concave strips and convex strips.

Referring to FIG. 3, FIG. 4, and FIG. 7, each of the terminal modules 100 includes: a lamellar fixing frame 1, a plurality of pairs of differential signal terminals 2, a plurality of conductive spacers 3, and a shielding plate 4. The lamellar fixing frame 1 has a mating side 10 and a mounting side 11 that are perpendicular to each other; a plurality of pairs of differential signal terminals 2 are arranged in a terminal row and supported by the fixing frame 1; each pair of the differential signal terminals 2 has a mating portion 20 extending forwardly and extending out of the mating side 10, a mounting portion 21 perpendicular to the mating portion 20, extending downwardly and extending out of the mounting side 11, and a base portion 22 connecting with the mating portion 20 and the mounting portion 21; a plurality of conductive spacers 3 are arranged in the terminal row at intervals; each of the conductive spacers 3 has an inserting end 30 extending forwardly and extending out of the mating side 10 and a connecting end 31 integrally formed with the inserting end 30, and arranged in an opposite direction of the inserting end 30; the shielding plate 4 is fixed on one side of the fixing frame 1 and connected with the conductive spacers 3; the shielding plate 4 includes alternately arranged concave strips 40 and convex strips 41, the concave strips 40 are recessed toward the fixing frame 1 and extend into the terminal row to be aligned with and connected with the conductive spacers 3; and the convex strips 41 protrude in a direction away from the fixing frame 1, each of the convex strips 41 surrounds a corresponding pair of the differential signal terminals 2.

It needs to be pointed out that: multiple conductive spacers 3 are arranged at intervals in the terminal row, which can be understood as that at least one conductive spacer 3 is located between two adjacent pairs of differential signal terminals 2, and can also be understood as that at least one conductive spacer 3 is provided on an upper side and a lower side of each pair of differential signal terminals 2.

In addition, the concave strips 40 are recessed toward the fixing frame 1 and extend into the terminal row to contact with the conductive spacers 3 to form a grounding loop.

Figure 5:
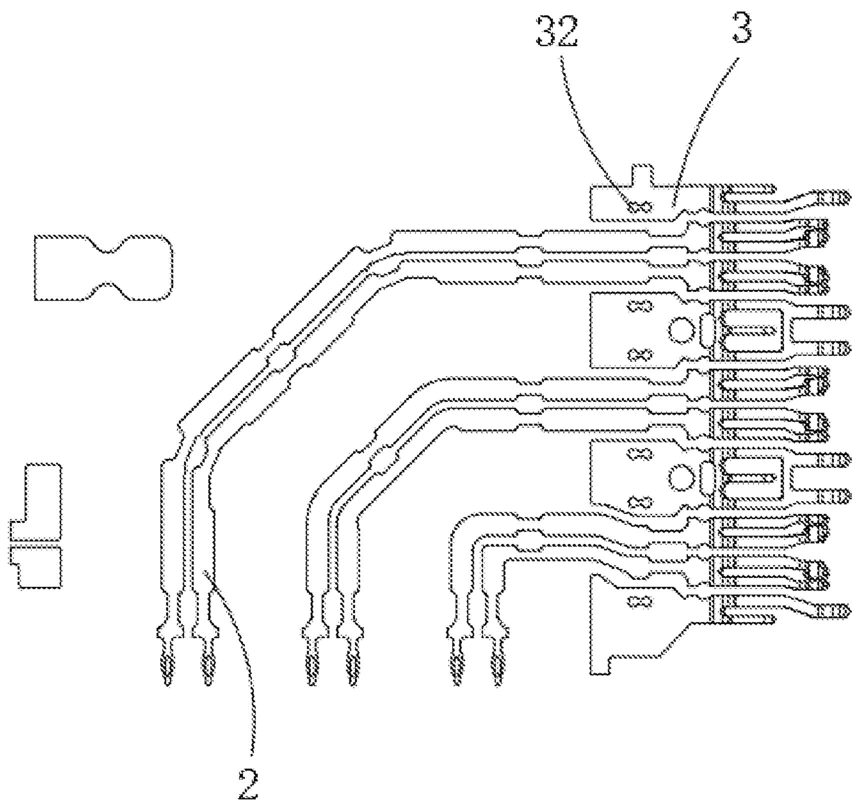
FIG. 5 is an arrangement schematic diagram of a plurality of pairs of differential signal terminals and conductive spacers in a terminal module in an embodiment of the present application.
Figure 6:
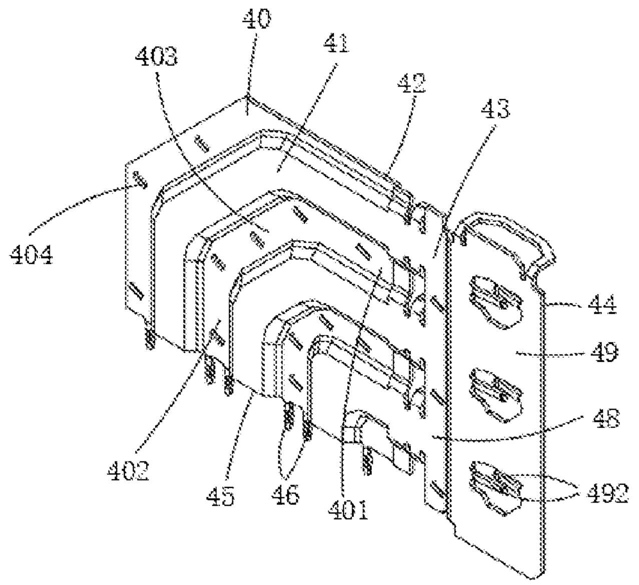
FIG. 6 is a three-dimensional structural schematic diagram of a shielding plate in an embodiment of the present application.

FIG. 5 is an arrangement schematic diagram of a plurality of pairs of differential signal terminals and conductive spacers in a terminal module in an embodiment of the present application; FIG. 6 is a three-dimensional structural schematic diagram of a shielding plate in an embodiment of the present application; referring to FIG. 3, FIG. 5 and FIG. 6, the shielding plate 4 has a shielding inner wall 42 and a shielding outer wall 43 arranged oppositely to each other, the shielding inner wall 42 faces the fixing frame 1, the shielding outer wall 43 is far away from the fixing frame 1, and the shielding inner wall 42 of at least one of the concave strips 40 extends between two adjacent pairs of the differential signal terminals 2 and is aligned with and connected with the connecting end 31 of the conductive spacer 3, and the shielding inner wall 42 of at least one of the convex strips 41 surrounds a corresponding pair of the differential signal terminals 2, so that the upper side, the lower side and an outer side of the pair of differential signal terminals 2 are shielded.

Referring to FIGS. 3 and 6, the shielding plate 4 has a front edge 44 and a bottom edge 45 that are perpendicular to each other, and each of the concave strips 40 protrudes from the bottom edge 45 downwardly with a grounding pin 46, and the grounding pins 46 and the mounting portions 21 of the differential signal terminals 2 are arranged in a row.

Based on the above embodiment, at least one of the concave strips 40 has a mating section 401 extending toward the front edge 44, a mounting section 402 perpendicular to the mating section 401 and extending toward the bottom edge 45, and a middle section 403 connected to the mating section 401 and the mounting section 402; the grounding pins 46 are disposed on the mounting section 402 and extend vertically and downwardly, wherein in a same terminal module 100, the grounding pins 46 and the mounting portions 21 of the differential signal terminals 2 are arranged in a row.

The above-mentioned grounding pins 46 and the shielding plate 4 are formed by an integrated-stamping process.

As shown in FIG. 4 and FIG. 6, the shielding plate 4 further comprises a clamping structure. The fixing frame 1 is provided with a fixing post 13 facing the shielding plate 4, and each of the concave strips 40 of the shielding plate 4 is provided with a fixing hole 404 corresponding to the fixing post 13, the fixing post 13 is inserted into a corresponding fixing hole 404. Wherein, the clamping structure includes a plurality of the fixing posts 13 and a plurality of the fixing holes 404.

In addition, a cross-sectional shape of the above-mentioned fixing post 13 and fixing hole 404 may be circular, square, or rectangular, which is not specifically limited in the present application, as long as it can be ensured that the fixing post 13 can be inserted into the corresponding fixing hole 404.

In some embodiments of the present application, the above-mentioned shielding plate 4 is further provided with a fixing structure, and the fixing structure is located in an extending direction of the concave strips 40; each of the conductive spacers 3 is provided with a connecting structure, the connecting end 31 extends to an inner cavity of the fixing frame 1, the connecting structure is disposed close to the connecting end 31 and is connected with the fixing structure for connecting with the shielding plate 4 and each of the conductive spacers 3.

Based on the above embodiment, the connecting structure is exposed on a surface of one side of the fixing frame 1 close to the shielding plate 4, that is, the connecting structure is located on a surface of a left side of the fixing frame 1, so as to facilitate a connection between the shielding plate 4 and the conductive spacers 3.

Figure 8:
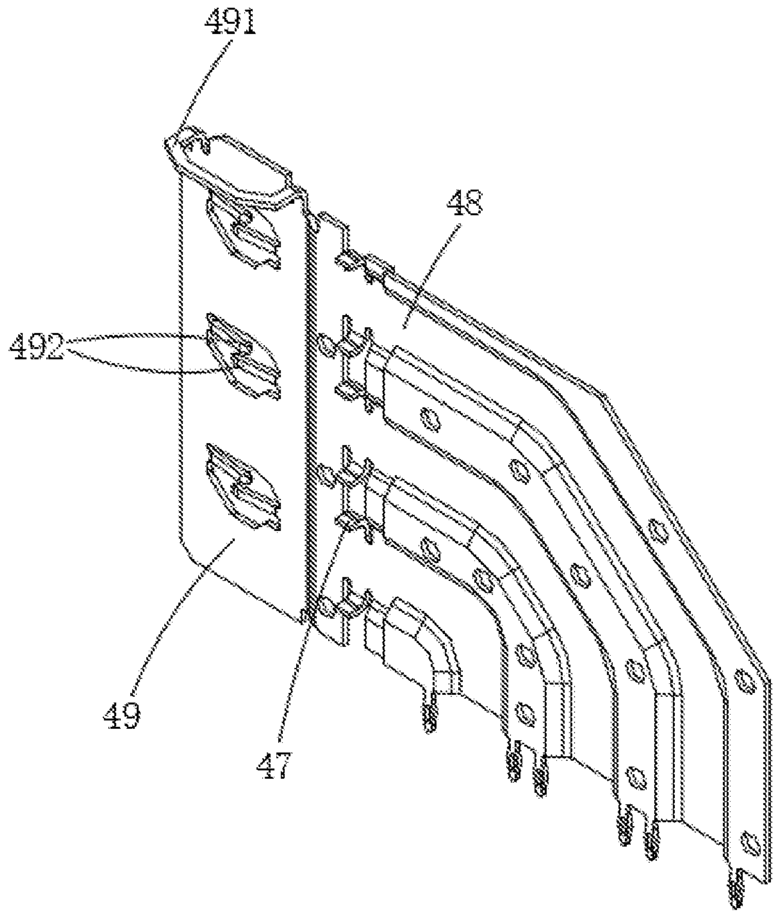
FIG. 8 is a structural schematic diagram of a shielding plate along another direction in an embodiment of the present application, so as to clearly show structures of protrusions.

As shown in FIG. 5 and FIG. 8, the fixing structure is a plurality of protrusions 47 arranged on the shielding plate 4, the protrusions 47 are bent and extend toward the fixing frame 1, and the connecting structure is a plurality of sockets 32 provided on the conductive spacers 3 and corresponding to the protrusions 47, the protrusions 47 are inserted into the sockets 32.

Wherein, the above-mentioned sockets 32 are defined close to the connecting end 31 of the conductive spacers 3. Positions of the above-mentioned protrusions 47 and the above-mentioned sockets 32 can be interchanged, that is, the sockets 32 are arranged on the shielding plate 4, and the protrusions 47 are arranged on the conductive spacers 3. Of course, other connecting structures and fixing structures can also be provided, as long as a connection between the concave strips 40 on the shielding plate 4 and the conductive spacers 3 can be achieved, and an effect of forming a grounding loop between the concave strips 40 on the shielding plate 4 and the conductive spacers 3 can be achieved.

Referring to FIG. 6 and FIG. 8, the shielding plate 4 has a shielding main plate 48 and a shielding front plate 49 connected with the shielding main plate 48 and close to a front end. The shielding front plate 49 is provided with a connecting portion, the connecting portion extends toward the shielding inner wall 42, and the connecting portion can be connected with the shielding plate 4 in two adjacent terminal modules 100.

The above-mentioned connecting portion is a collar 491, and the collar 491 extends vertically from an upper edge or a lower edge of the shielding front plate 49 toward the shielding inner wall 42.

Wherein, in order to make structures between the terminal modules 100 more compact, and to further reduce interference and crosstalk between the differential signal terminals 2 in the adjacent terminal modules 100, positions of the connecting portions on the above-mentioned two adjacent shielding plates 4 are different, that is, when the connecting portion on the shielding front plate 49 of one shielding plate 4 of the adjacent two shielding plates 4 is arranged on the upper edge of the shielding front plate 49, the connecting portion on the shielding front plate 49 of another shielding plate 4 of the two adjacent shielding plates 4 is arranged on the lower edge of the shielding front plate 49, as shown in FIG. 3.

In some embodiments of the present application, the shielding front plate 49 is provided with a plurality of elastic fingers 492 protruding to the shielding inner wall 42.

In addition, it should be pointed out that the concave strips 40, the convex strips 41, the grounding pins 46, and the protrusions 47 are all distributed on the shielding main plate 48.

Referring to FIG. 3, the terminal module 100 provided by the present application includes at least one group of terminal module components, and each terminal module component includes a first terminal module 1*a* and a second terminal module 1*b* arranged adjacently, the first terminal module 1*a* includes a first shielding plate 4*a*, and the second terminal module 1*b* includes a second shielding plate 4*b*. The first shielding plate 4*a* and the second shielding plate 4*b* both have a shielding inner wall and a shielding outer wall arranged oppositely, and alternately arranged concave strips 40/40*a* and convex strips 41/41*a*; the concave strips 40/40*a* are recessed from the shielding outer wall toward the shielding inner wall; the convex strips 41/41*a* protrude from the shielding inner wall toward the shielding outer wall.

More specific structures of the first terminal module 1*a* and the second terminal module 1*b* are same as those described above for the terminal module 100.

The following will highlight differences between the two:

A pattern formed by the concave strips 40*a* and the convex strips 41*a* located on the first shielding plate 4*a* is different from a pattern formed by the concave strips 40*a* and the convex strips 41*a* located on the second shielding plate 4*b*, positions of the patterns of the two are generally staggered from each other to correspond to different arrangements of terminal rows in the respective terminal module 100. That is, positions of the concave strips 40*a* on the first shielding plate 4*a* and the concave strips 40*a* on the second shielding plate 4*b* are staggered from each other, and positions of the convex strips 41*a* on the first shielding plate 4*a* and the convex strips 41*a* on the second shielding plate 4*b* are staggered from each other.

In addition, the first shielding plate 4*a* and the second shielding plate 4*b* are connected by a connecting portion. The connecting portion on the first shielding plate 4*a* is connected with the second shielding plate 4*b*. The connecting portion on the second shielding plate 4*b* is connected with other shielding plates 4/4', and in this way, they are connected in sequence to achieve a complete and effective grounding loop.

The connecting portion may be, for example, a collar. A collar 491*a* on the shielding front plate 49 in the first shielding plate 4*a* is arranged on the lower edge of the shielding front plate 49, a collar 491*b* on the shielding front plate 49 in the second shielding plate 4*b* is disposed on the upper edge of the shielding front plate 49, wherein position of the shielding front plate 49 is shown in FIG. 6.

Figure 9:
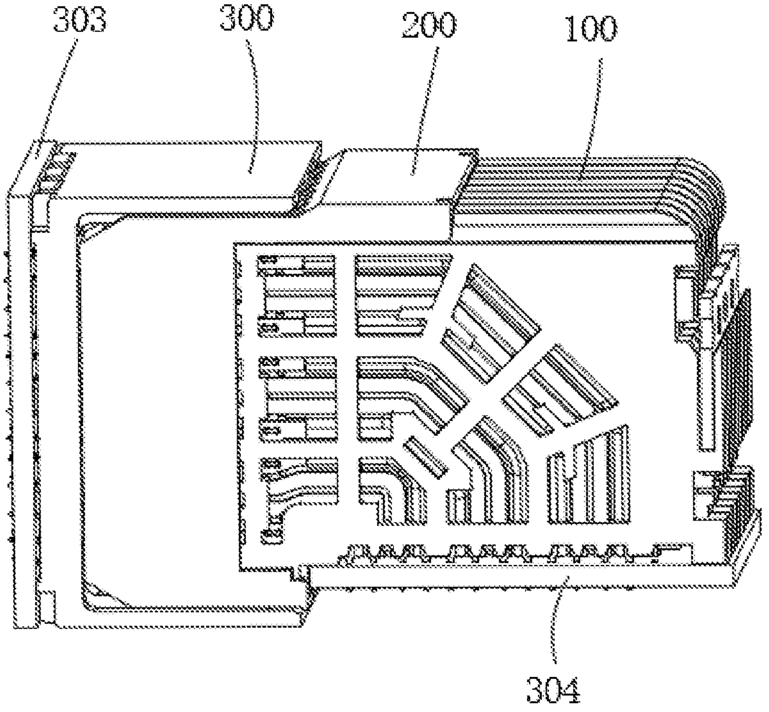
FIG. 9 is a structural schematic diagram of a connector system in an embodiment of the present application.
Figure 10:
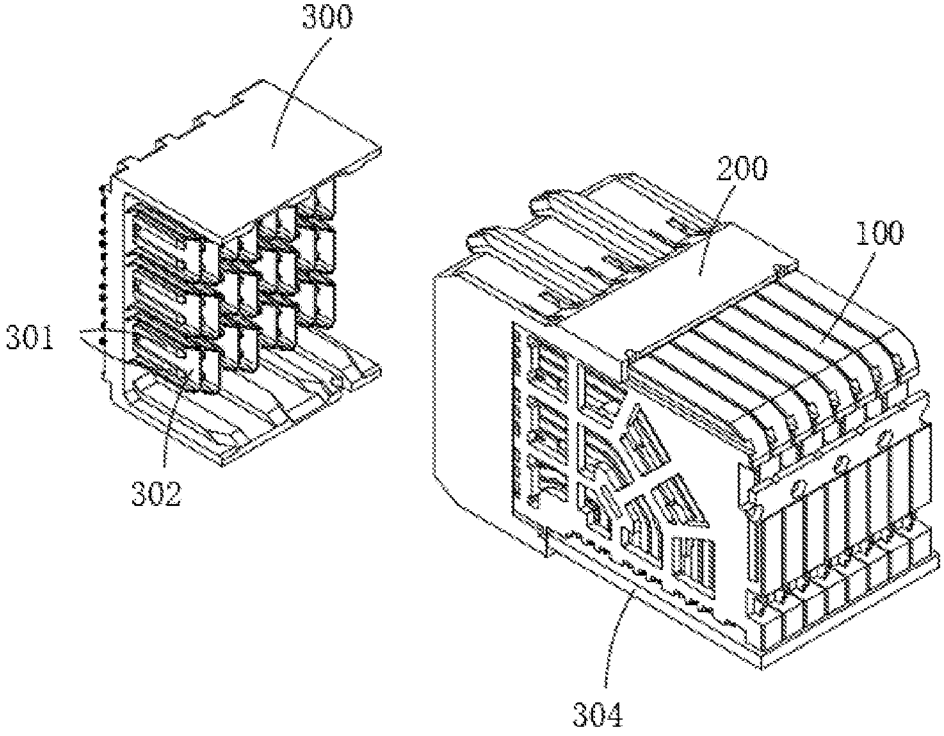
FIG. 10 is an exploded schematic diagram of a connector system in the present application, which mainly shows a structure of a U-shaped base in a first connector.

FIG. 9 is a structural schematic diagram of a connector system in an embodiment of the present application; FIG. 10 is a structural schematic diagram of a U-shaped base in a first connector in a connector system, referring to FIGS. 9 to 10, an embodiment of the connector system includes a connection between a first circuit board 303 and a circuit board 304 that are perpendicular to each other. Specifically, the first connector is mounted on the first circuit board 303 and arranged to be mated with a second connector mounted on the circuit board 304.

The first connector includes a U-shaped base 300, a plurality of pairs of first differential signal terminals 301 fixed on the base 300, and a plurality of first shielding members 302 fixed on the base 300 and corresponding to the first differential signal terminals 301; the second connector (that is, the above-mentioned high-speed backplane connector, referring to FIGS. 1 to 8) includes a plurality of terminal modules 100 arranged in parallel, and an insulative shell 200 for receiving and fixing the terminal modules 100, each of the terminal modules 100 includes: a lamellar fixing frame 1 including a mating side 10 and a mounting side 11 that are perpendicular to each other; a plurality of pairs of differential signal terminals 2 arranged in a terminal row and supported by the fixing frame 1; each pair of the differential signal terminals 2 has a mating portion 20 extending forwardly and extending out of the mating side 10, a mounting portion 21 perpendicular to the mating portion 20, extending downwardly and extending out of the mounting side 11, and a base portion 22 connecting with the mating portion 20 and the mounting portion 21; a plurality of conductive spacers 3 arranged in the terminal row at intervals; each of the conductive spacers 3 has an inserting end 30 extending forwardly and extending out of the mating side 10 and a connecting end 31 integrally formed with the inserting end 30, and arranged in an opposite direction of the inserting end 30; a shielding plate 4 fixed on one side of the fixing frame 1 and connected with the conductive spacers 3; the shielding plate 4 includes alternately arranged concave strips 40 and convex strips 41, the concave strips 40 are recessed toward the fixing frame 1 and extend into the terminal row to be aligned with and connected with the conductive spacers 3; and the convex strips 41 protrude in a direction away from the fixing frame 1, each of the convex strips 41 surrounds a corresponding pair of the differential signal terminals 2. Wherein, the mating portions 20 are used to mate with the first differential signal terminals 301, the inserting ends 30 of the conductive spacers 3 are used to mate with the first shielding member 302, and the mounting portions 21 and the grounding pins 46 are used to connect with the circuit board 304.

The shielding plate 4' and the conductive spacers 3' in another embodiment of the present application as shown in FIGS. 11 to 15, differences between another embodiment of the present application and the above-mentioned embodiment are: the fixing structure of the shielding plate 4' shown in another embodiment of the present application is one of tenon and mortise 480', the connecting end 31' of the conductive spacer 3' is another one of the tenon and the mortise 480', and the fixing structure and the connecting end 31' of the conductive spacer 3' form a mortise-and-tenon connection.

In the tenon-and-mortise connection, a protruding part is usually called a tenon, and a recess part is called a mortise, the tenon and the mortise 480' are engaged for connection, and the tenon is inserted into the corresponding mortise 480' to connect and fix the two components, so that the grounding connection between the shielding plate 4' and the conductive spacer 3' is stable and reliable, that is, at least a part of the conductive spacer 3' is embedded horizontally in the shielding plate 4', so that at least a part of the conductive spacer 3' and the shielding plate 4' overlap in a thickness direction, thus contributing to reducing a thickness of a connecting position between the shielding plate 4' and the conductive spacer 3'.

Figure 11:
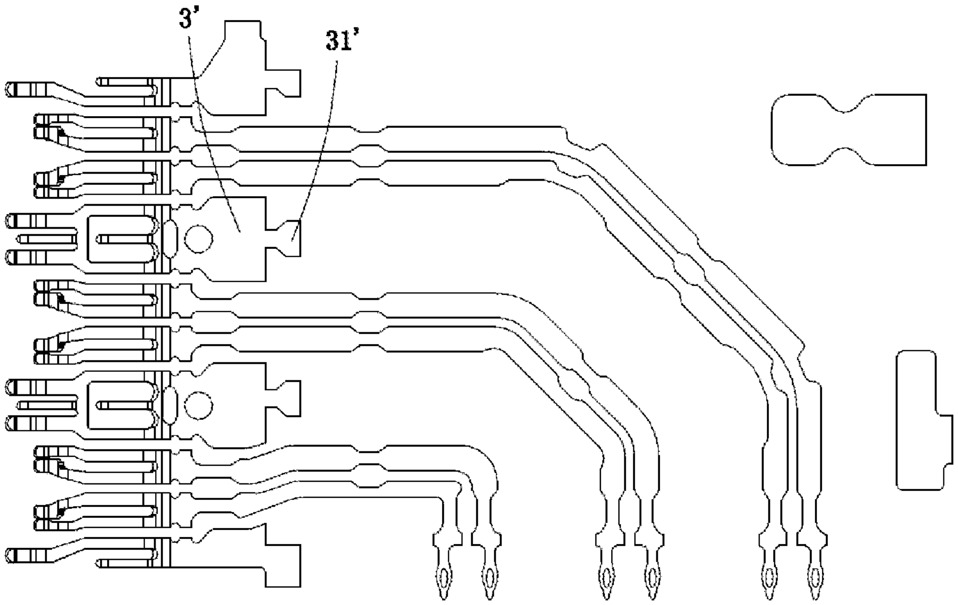
FIG. 11 is an arrangement schematic diagram of a plurality of pairs of differential signal terminals and conductive spacers in another embodiment of the present application.
Figure 12:
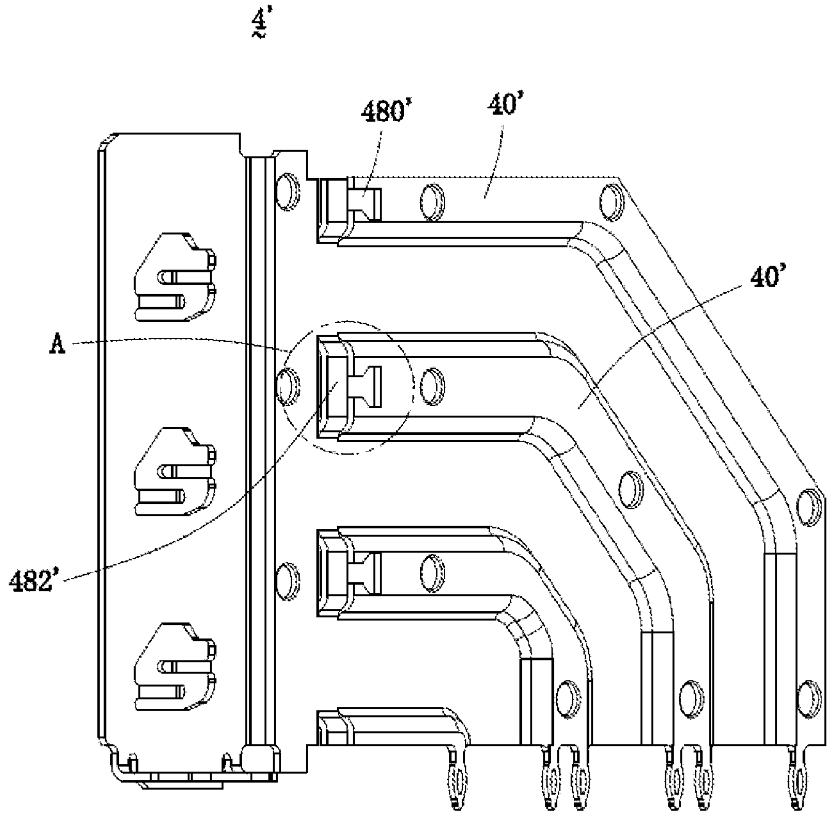
FIG. 12 is a three-dimensional structural schematic diagram of a shielding plate in another embodiment of the present application.
Figure 13:
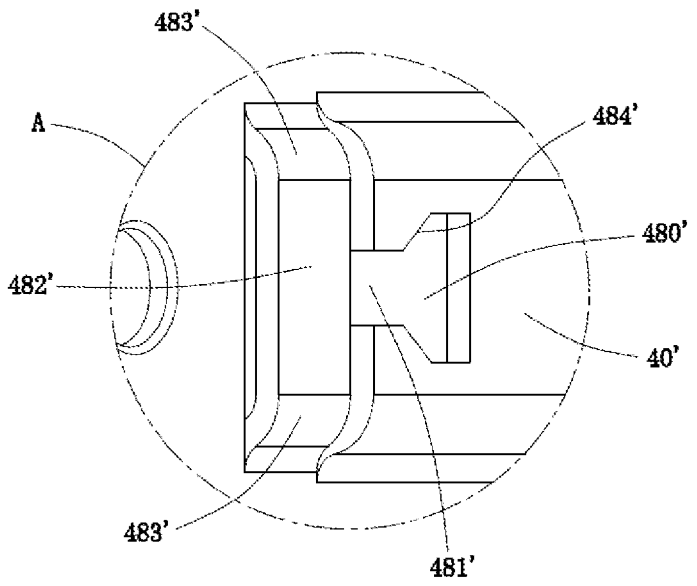
FIG. 13 is an enlarged diagram of part A in FIG. 12.
Figure 14:
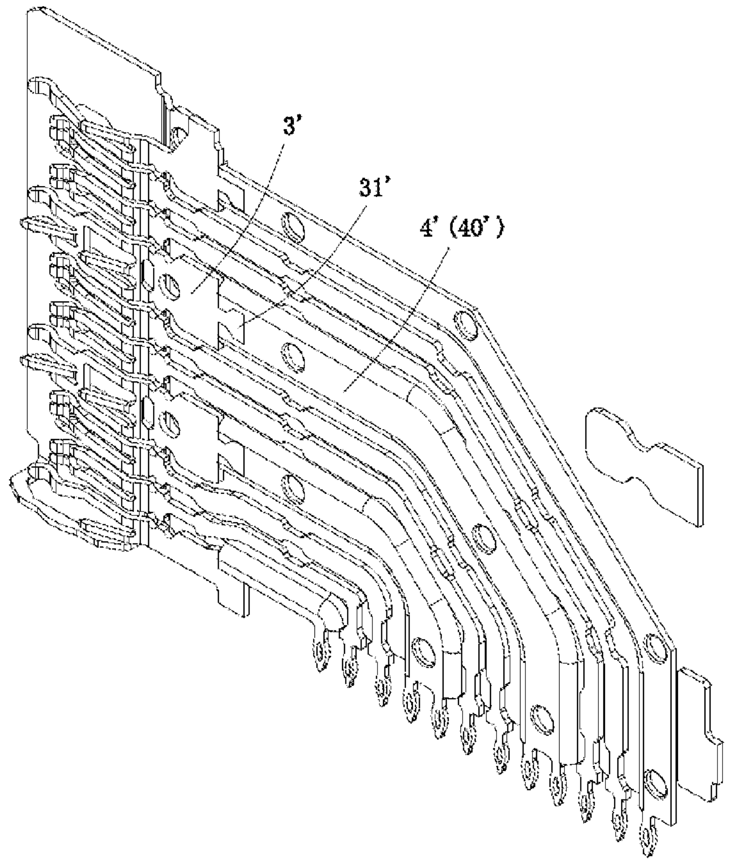
FIG. 14 is a schematic diagram of relative positions of a conductive spacer, a pair of differential signal terminals, and a shielding plate in another embodiment of the present application.
Figure 15:
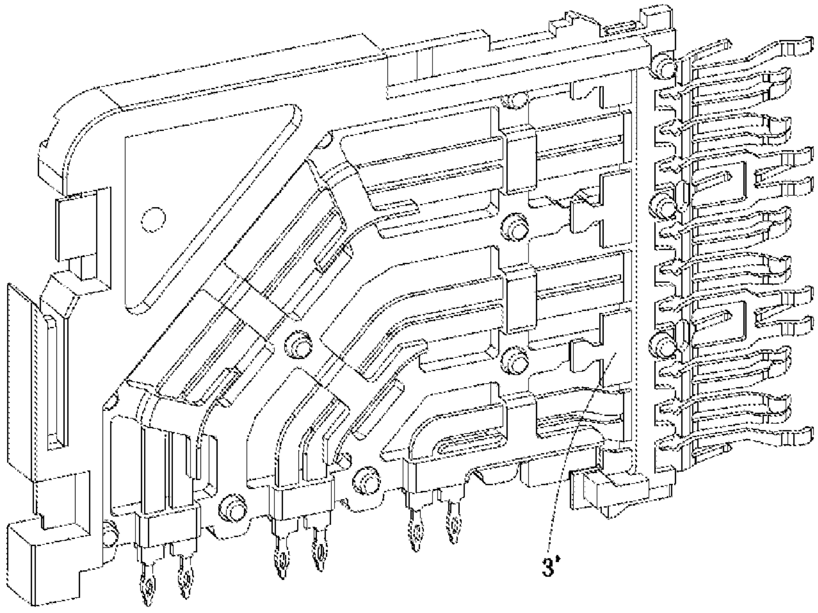
FIG. 15 is a schematic diagram of a combination of a conductive spacer, a pair of differential signal terminals, and a fixing frame in another embodiment of the present application.

Specifically, as shown in FIG. 12 and FIG. 13, the fixing structure of the shielding plate 4' can be set as the mortise 480', and the connecting end 31' of the conductive spacer 3' can be set as the tenon, as shown in FIG. 11. The mortise 480' has an opening 481', and the opening 481' is disposed towards the front edge of the shielding plate 4'. The tenon mated with the mortise 480' is disposed away from the front edge of the shielding plate 4'. A shape of the mortise 480' includes any one or a combination of a circle, a trapezoid, a triangle, a rectangle, a square, and a plum blossom. In some embodiments of the present application, the mortise 480' is provided with a limiting portion 484' obliquely, and the limiting portion 484' is used to limit a movement of the shielding plate 4' in a forward and backward direction, thereby realizing fixing of the shielding plate 4' in the forward and backward direction.

Of course, the fixing structure of the shielding plate 4' can also be set as the tenon, and the connecting end 31' of the conductive spacer 3' can be set as the mortise 480'. The tenon is disposed towards the front edge 44 of the shielding plate 4', the mortise 480' mated with the tenon comprises an opening 481', the opening 481' is disposed away from the front edge 44 of the shielding plate 4'. And a shape of the tenon includes any one or a combination of a circle, a trapezoid, a triangle, a rectangle, a square, and a plum blossom.

As shown in FIGS. 12 to 13, the fixing structure is located in an extending direction of the concave strips 40'. In addition, each of the concave strips 40' is also provided with a grounding-contacting portion 482', the grounding-contacting portion 482' is located at a front end of the concave strips 40', the grounding-contacting portion 482' is used to form a grounding-contact with the conductive spacer 3', so as to increase a contact area between the conductive spacer 3' and the shielding plate 4', so that the grounding connection effect is better, which can reduce inductance and a sudden inductive change of current.

More specifically, the grounding-contacting portion 482' is a contacting plate, and the contacting plate is connected with the shielding plate 4' through two connecting arms 483'. Each connecting arm 483' can constitute a return loop between the shielding plate 4' and the grounding-contacting portion 482'.

As can be seen from above, the connecting arms 483', the grounding-contacting portion 482', and the shielding plate 4' in the present application are an integral structure, making the structure of the grounding-contacting portion 482' more stable, contributing to reducing inductance of the current loop, optimizing the return loop, and improving a resonance problem.

An Advantageous Effect of the Present Application are as Follows:

In a first aspect, the shielding plate 4 provided by the present application can form a grounding protection effect on the differential signal terminals 2 to be protected by providing the concave strips 40 and the convex strips 41, and at a same time providing a function of preventing electromagnetic interference.

In a second aspect, the shielding plate 4 is provided on one side of the fixing frame 1 in the terminal module 100 provided by the present application, and the shielding plate 4 is connected with the conductive spacers 3 at a same time; the shielding plate 4 includes alternately arranged concave strips 40 and convex strips 41, the concave strips 40 are recessed toward the fixing frame 1 and extend into the terminal row to be aligned with and connected with the conductive spacers 3, and the convex strips 41 protrude in a direction away from the fixing frame 1, each of the convex strips 41 surrounds a corresponding pair of the differential signal terminals 2.

By arranging the concave strips 40 and the convex strips 41, an upper side, a lower side and an outer side of the pair of differential signal terminals 2 can be shielded, and another shielding plate 4 adjacent to the shielding plate 4 can shield the pair of differential signal terminals 2 close to a side of another shielding plate 4, thereby forming a complete shielding structure around the pair of differential signal terminals 2, and interference and crosstalk between the adjacent pairs of differential signal terminals 2 are effectively reduced.

In addition, the terminal module 100 provided in the present application includes at least one group of terminal module component, and each terminal module component includes a first terminal module 1*a* and a second terminal module 1*b* arranged adjacently, since the first terminal module 1*a* and the second terminal module 1*b* provided in the present application have a same structure as the above-mentioned terminal module 100, therefore, the terminal module 100 provided by the present application can effectively reduce interference and crosstalk between the adjacent pairs of differential signal terminals 2.

In addition, the shielding plate 4' and the conductive spacers 3' provided in another embodiment of the present application are connected by tenon and mortise 480', which ensures a stable and reliable grounding connection at a connecting position between the shielding plate 4' and the conductive spacers 3'.

Thirdly, the high-speed backplane connector in the present application can effectively reduce interference and crosstalk between the adjacent pairs of differential signal terminals 2 by providing the above-mentioned terminal module 100.

Fourthly, the connector system provided by the present application includes a first connector and a second connector that are cooperated with each other, wherein the second connector has a same structure as the above-mentioned high-speed backplane connector, so the connector system provided by the present application can achieve a same technical effect as the above-mentioned high-speed backplane connector, that is, the connector system provided by the present application can effectively reduce interference and crosstalk between the adjacent pairs of differential signal terminals 2.

Above are only specific implementations of the present application, but a protection scope of the present application is not limited to this. Any person skilled in the art can easily think of changes or substitutions within the technical scope disclosed in the present application, which should be covered by the protection scope of the present application. Therefore, the protection scope of the present application shall be subject to the protection scope of the claims.

What is claimed is:

1. A shielding plate, comprising a shielding inner wall and a shielding outer wall arranged oppositely, wherein the shielding plate comprises alternately arranged a plurality of concave strips and a plurality of convex strips;

the concave strips are recessed from the shielding outer wall to the shielding inner wall;

the convex strips are protruded from the shielding inner wall to the shielding outer wall;

the shielding plate comprises a front edge and a bottom edge that are perpendicular to each other, each of the concave strips protrudes downwardly at the bottom edge with a grounding pin, and the grounding pins are arranged in a row, the shielding plate further comprises a shielding main plate and a shielding front plate connected with the shielding main plate and close to a front end, the shielding front plate is provided with a collar extending toward the shielding inner wall, and the collar is formed by being vertically bent from an upper edge or a bottom edge of the shielding front plate toward the shielding inner wall.

2. The shielding plate as claimed in claim 1, wherein at least one of the concave strips has a mating section extending toward the front edge, a mounting section perpendicular to the mating section and extending toward the bottom edge, a middle section connecting the mating section and the mounting section, the grounding pins are disposed on the mounting section, and the grounding pins extend vertically and downwardly and extend out of the bottom edge of the shielding plate.

3. The shielding plate as claimed in claim 1, wherein the shielding plate comprises a fixing structure.

4. The shielding plate as claimed in claim 3, wherein the fixing structure comprises a plurality of protrusions, the protrusions are bent and protrude to the shielding inner wall.

5. The shielding plate as claimed in claim 3, wherein the fixing structure comprises a plurality of sockets.

6. The shielding plate as claimed in claim 1, wherein the shielding plate further comprises a clamping structure, the clamping structure comprises a plurality of fixing holes, the fixing holes pass through the shielding inner wall and the shielding outer wall; and the fixing holes are located on the concave strips.

7. The shielding plate as claimed in claim 1, wherein the shielding front plate is provided with a plurality of elastic fingers protruding to the shielding inner wall.

8. The shielding plate as claimed in claim 3, wherein the fixing structure is located in an extending direction of the concave strips, and the fixing structure is one of a tenon and a mortise.

9. The shielding plate as claimed in claim 8, wherein the fixing structure is the mortise, the mortise comprises an opening, the opening is disposed towards the front edge of the shielding plate, a tenon mated with the mortise is disposed away from the front edge of the shielding plate, and a shape of the mortise comprises any one or a combination of a circle, a trapezoid, a triangle, a rectangle, a square, and a plum blossom.

10. The shielding plate as claimed in claim 8, wherein the fixing structure is the tenon, the tenon is disposed towards the front edge of the shielding plate, a mortise mated with the tenon comprises an opening, the opening is disposed away from the front edge of the shielding plate, and a shape of the tenon comprises any one or a combination of a circle, a trapezoid, a triangle, a rectangle, a square, and a plum blossom.

11. The shielding plate as claimed in claim 8, wherein each of the concave strips is further provided with a grounding-contacting portion, and the grounding-contacting portion is located at a front end of each of the concave strips.

12. The shielding plate as claimed in claim 11, wherein the grounding-contacting portion is a contacting plate, and the contacting plate is connected to the shielding plate through two connecting arms.

13. A terminal module, comprising:

a lamellar fixing frame comprising a mating side and a mounting side that are perpendicular to each other;

a plurality of pairs of differential signal terminals arranged in a terminal row and supported by the fixing frame; each pair of the differential signal terminals has a mating portion extending forwardly and extending out of the mating side, a mounting portion perpendicular to the mating portion and extending downwardly and extending out of the mounting side, and a base portion connecting the mating portion and the mounting portion;

a plurality of conductive spacers arranged in the terminal row at intervals; each of the conductive spacers has an inserting end extending forwardly and extending out of the mating side, and a connecting end integrally formed with the inserting end, and arranged in an opposite direction of the inserting end; and a shielding plate fixed on one side of the fixing frame and connected with the conductive spacers, wherein the shielding plate comprises a shielding inner wall and a shielding outer wall arranged oppositely, wherein the shielding plate comprises alternately arranged a plurality of concave strips and a plurality of convex strips, the concave strips are recessed from the shielding outer wall to the shielding inner wall, the convex strips are protruded from the shielding inner wall to the shielding outer wall, the shielding plate comprises a front edge and a bottom edge that are perpendicular to each other, each of the concave strips protrudes downwardly at the bottom edge with a grounding pin, and the grounding pins are arranged in a row, and the concave strips are recessed toward the fixing frame and extend into the terminal row aligned with and connected with the conductive spacers, and the convex strips protrude in a direction away from the fixing frame, each of the convex strips surrounds a corresponding pair of the differential signal terminals.

14. A high-speed backplane connector, comprising a plurality of terminal modules arranged in parallel, and an insulative shell for receiving and fixing the terminal modules;

each of the terminal module comprises a lamellar fixing frame comprising a mating side and a mounting side that are perpendicular to each other;

a plurality of pairs of differential signal terminals arranged in a terminal row and supported by the fixing frame; each pair of the differential signal terminals has a mating portion extending forwardly and extending out of the mating side, a mounting portion perpendicular to the mating portion and extending downwardly and extending out of the mounting side, and a base portion connecting the mating portion and the mounting portion;

a plurality of conductive spacers arranged in the terminal row at intervals; each of the conductive spacers has an inserting end extending forwardly and extending out of the mating side, and a connecting end integrally formed with the inserting end, and arranged in an opposite direction of the inserting end; and a shielding plate fixed on one side of the fixing frame and connected with the conductive spacers, wherein the shielding plate comprises a shielding inner wall and a shielding outer wall arranged oppositely, wherein the shielding plate comprises alternately arranged a plurality of concave strips and a plurality of convex strips, the concave strips are recessed from the shielding outer wall to the shielding inner wall, the convex strips are protruded from the shielding inner wall to the shielding outer wall, the shielding plate comprises a front edge and a bottom edge that are perpendicular to each other, each of the concave strips protrudes downwardly at the bottom edge with a grounding pin, and the grounding pins are arranged in a row, and the concave strips are recessed toward the fixing frame and extend into the terminal row aligned with and connected with the conductive spacers, and the convex strips protrude in a direction away from the fixing frame, each of the convex strips surrounds a corresponding pair of the differential signal terminals.

15. The high-speed backplane connector as claimed in claim 14, wherein the shielding plate comprises a fixing structure.

16. The high-speed backplane connector as claimed in claim 15, wherein the fixing structure is the mortise, the mortise comprises an opening, the opening is disposed towards the front edge of the shielding plate, a tenon mated with the mortise is disposed away from the front edge of the shielding plate, and a shape of the mortise comprises any one or a combination of a circle, a trapezoid, a triangle, a rectangle, a square, and a plum blossom.

17. The high-speed backplane connector as claimed in claim 15, wherein the fixing structure is the tenon, the tenon is disposed towards the front edge of the shielding plate, a mortise mated with the tenon comprises an opening, the opening is disposed away from the front edge of the shielding plate, and a shape of the tenon comprises any one or a combination of a circle, a trapezoid, a triangle, a rectangle, a square, and a plum blossom.

18. A connector system, comprising a first connector and a second connector that are cooperated with each other, the first connector comprises a U-shaped base, a plurality of pairs of first differential signal terminals fixed on the base, and a plurality of first shielding members fixed on the base and corresponding to the first differential signal terminals;

the second connector is a high-speed backplane connector, wherein the high-speed backplane connector, comprising a plurality of terminal modules arranged in parallel, and an insulative shell for receiving and fixing the terminal modules;

each of the terminal module comprises a lamellar fixing frame comprising a mating side and a mounting side that are perpendicular to each other;

a plurality of pairs of differential signal terminals arranged in a terminal row and supported by the fixing frame; each pair of the differential signal terminals has a mating portion extending forwardly and extending out of the mating side, a mounting portion perpendicular to the mating portion and extending downwardly and extending out of the mounting side, and a base portion connecting the mating portion and the mounting portion;

a plurality of conductive spacers arranged in the terminal row at intervals; each of the conductive spacers has an inserting end extending forwardly and extending out of the mating side, and a connecting end integrally formed with the inserting end, and arranged in an opposite direction of the inserting end; and a shielding plate fixed on one side of the fixing frame and connected with the conductive spacers, wherein the shielding plate comprises a shielding inner wall and a shielding outer wall arranged oppositely, wherein the shielding plate comprises alternately arranged a plurality of concave strips and a plurality of convex strips, the concave strips are recessed from the shielding outer wall to the shielding inner wall, the convex strips are protruded from the shielding inner wall to the shielding outer wall, the shielding plate comprises a front edge and a bottom edge that are perpendicular to each other, each of the concave strips protrudes downwardly at the bottom edge with a grounding pin, and the grounding pins are arranged in a row, and the concave strips are recessed toward the fixing frame and extend into the terminal row aligned with and connected with the conductive spacers, and the convex strips protrude in a direction away from the fixing frame, each of the convex strips surrounds a corresponding pair of the differential signal terminals;

wherein, the mating portions are used for mating with the first differential signal terminals, the inserting ends of the conductive spacers are used for mating with the first shielding members, and the mounting portions and the grounding pins are used for connecting with a circuit board.

* * * * *